United States Patent
Napierala et al.

(10) Patent No.: US 11,124,688 B2
(45) Date of Patent: Sep. 21, 2021

(54) COMPOSITION COMPRISING AN ALKOXYLATED AMINE COMPOUND AND A CARBOXYLIC ACID COMPOUND, USE THEREOF IN WATER IN OIL EMULSIONS AND PROCESS USING THE COMPOSITION AS OR AS PART OF A DRILLING FLUID

(71) Applicant: Sasol Performance Chemicals GmbH, Hamburg (DE)

(72) Inventors: Heinz Napierala, Herten (DE); Ludger Bosing, Dorsten (DE)

(73) Assignee: Sasol Chemicals GmbH, Hamburg (DE)

( * ) Notice: Subject to any disclaimer, the term of this patent is extended or adjusted under 35 U.S.C. 154(b) by 255 days.

(21) Appl. No.: 15/913,564

(22) Filed: Mar. 6, 2018

(65) Prior Publication Data

US 2018/0251667 A1 Sep. 6, 2018

Related U.S. Application Data

(63) Continuation of application No. 14/379,782, filed as application No. PCT/EP2013/000487 on Feb. 20, 2013, now Pat. No. 9,909,049.

(30) Foreign Application Priority Data

Feb. 20, 2012 (DE) .................. 102012003224.2

(51) Int. Cl.
*C09K 8/36* (2006.01)
*C09K 8/28* (2006.01)
*C10G 1/04* (2006.01)
*E21B 21/01* (2006.01)
*E21B 21/06* (2006.01)

(52) U.S. Cl.
CPC .................. *C09K 8/36* (2013.01); *C09K 8/28* (2013.01); *C10G 1/04* (2013.01); *E21B 21/012* (2013.01); *E21B 21/065* (2013.01)

(58) Field of Classification Search
CPC ............ C09K 8/28; C09K 8/36; E21B 21/065
See application file for complete search history.

(56) References Cited

U.S. PATENT DOCUMENTS

| | | | |
|---|---|---|---|
| 3,125,517 | A | 3/1964 | Voda |
| 4,293,428 | A | 10/1981 | Gale et al. |
| 4,425,244 | A | 1/1984 | House |
| 2004/0259738 | A1 | 12/2004 | Patel |
| 2007/0049500 | A1 | 3/2007 | Mueller et al. |
| 2011/0011645 | A1 | 1/2011 | Muller et al. |

FOREIGN PATENT DOCUMENTS

| | | |
|---|---|---|
| CA | 2047697 | 7/2001 |
| DE | 102006003201 | 7/2007 |
| EP | 0946669 | 9/2002 |
| WO | 98/05733 | 2/1998 |
| WO | 01/00758 | 1/2001 |
| WO | 2008/089858 | 7/2008 |

*Primary Examiner* — Aiqun Li
(74) *Attorney, Agent, or Firm* — Bushman Werner, P.C.

(57) ABSTRACT

The object of the present invention is a composition comprising amine compound and carboxylic acid compounds, wherein at least the amine compounds are alkoxylated, use thereof as a drilling fluid, and a method for using the drilling fluid.

29 Claims, No Drawings

COMPOSITION COMPRISING AN ALKOXYLATED AMINE COMPOUND AND A CARBOXYLIC ACID COMPOUND, USE THEREOF IN WATER IN OIL EMULSIONS AND PROCESS USING THE COMPOSITION AS OR AS PART OF A DRILLING FLUID

The present invention relates to a composition containing amine and carboxylic acid compounds as oil in water emulsifier systems, the use thereof in oil based drilling fluids and a process using the drilling fluids.

RELATED ART

A drilling fluid also named drilling mud is a fluid that is pumped through a drilled hole while drilling is being carried out in order to ease the drilling process. The various functions of a drilling fluid include the removal of drilled material below the drill head, transporting the drilled material (cuttings) out of the drilled hole, cooling and lubricating the drill bit, supporting the drill pipe and the drill bit, stabilising the drill hole walls, suspending the cuttings when circulation is stopped, providing a liquid column to regulate the hydrostatic pressure at the surface and preventing a "blowout". The compositions of drilling fluids are often adapted to the properties of a given geological formation in order to optimise a drilling process. Drilling fluids are usually thickened, flowable systems with a water or oil base. Oil-base drilling fluids are used for example in offshore drilling applications and for drilling through water-sensitive layers and/or aquifers.

Oil-based drilling fluids are generally divided into invertible emulsion drilling fluids or conventional non-invertible drilling fluids. Both comprise a three-phase system: a continuous oil phase, a dispersed water phase and finely particulate solids. These compositions are of the water-in-oil emulsion type. This means that the aqueous phase, which constitutes the internal phase, is finely distributed in the oil phase and the oil phase forms the external phase.

Oil-based drilling fluids contain a base oil, which forms the external phase, an aqueous solution containing a salt as the internal phase, and an emulsifier or emulsifier system, which acts on the boundary surface between the internal and external phases. Other additives are used to stabilise and adjust the functional characteristics.

The advantage of oil-based drilling fluids lies in its excellent lubricating properties. These lubricating properties enable drilling to be carried out with a considerable vertical offset, for example, as is typical of offshore or deep water drilling operations. In horizontal and almost horizontal wellbores, the drill pipe lies on the lower side of the drill hole, which results in high torques when drilling and when drawing the drill pipe. Under these conditions, the risk of a stuck pipe is greater when water-based drilling fluids are used. In contrast, oil-based drilling fluids form thin, flat filter cakes on the walls of the drilled hole and also have better characteristics than water-based drilling fluids with regard to the swelling of chalks that are usually present in the formation rock.

Besides their lubricating properties, important functional characteristics of oil-based drilling fluids also include viscosity, density and filtrate control. Filtrate control is particularly important in unconsolidated permeable formations. In such conditions, under hydrostatic pressure the drilled material forms a semi-permeable, fluid-impermeable layer (for example in the form of a filter cake) on the walls of the drilled hole, thus reducing fluid loss, stabilising the formation pressure and reducing that risk that the walls in the drilled hole will collapse.

When conventional emulsifiers are used, it may be necessary to use solvents and other surface-active additives in order to penetrate the filter cake and alter the wettability of the filter cake particles. Water-wetted solids are essential for a subsequent acid wash, to dissolve or disperse the particles of the filter cake, for example.

Amine-based emulsifiers for invert emulsion drilling fluids that can be converted from an oil-in-water emulsion into a water-in-oil emulsion are described in WO 98/05733.

The complexity and unpredictability of the external conditions and the interactions of the fluid components both with each other and with the conditions during drilling mean that a drilling fluid must be capable of sustaining considerable loads, which poses a challenge for developers. There is a constant need, and thus also undiminished interest throughout the industry in new drilling fluids that offer improved performance and at the same time improved ecological and economical acceptance.

SUMMARY OF THE INVENTION

The object of the invention is providing a composition comprising a water-in-oil emulsifier system for use in or as a water-in-oil drilling fluid, hereafter also referred to in short as a drilling fluid, a use thereof, and a process, as described in the independent claims. Use of the emulsifier composition for water-in-oil emulsion is also claimed. Preferred embodiments are described in the subordinate claims or herein below.

Surprisingly, a water-in-oil emulsifier system for use in "emulsion drilling fluids" was found. Drilling fluids based on the emulsifier system according to the invention are notable for their surprisingly good stability and other advantageous functional characteristics. In particular, increased stability is observed in respect of influences such as varying water and salt content (salinity) as well as usability over a wide range of temperatures. The water-in-oil emulsifier system is also suitable for other applications, such as emulsifying water or brine in heavy oils, lowering viscosity and improving flow properties of heavy oil fractions.

Important application areas for the drilling fluids are boreholes for developing oil and gas fields, geothermal bores or water drill holes, or also drilling geo-scientific bores or mining drill holes.

The drilling fluid according to the invention comprises an oily, also referred to as the oil phase, an emulsifier system comprising at least two emulsifiers, water, optionally in form of brine, thickening agents and further additives.

An example of additives used in the composition according to the invention are the additives for wetting, weighting agents to increase weight or density, "fluid loss" additives to minimize fluid loss, additives for creating an alkalinity reserve, additives for filtration control and/or to control rheological properties.

When the individual components of the composition according to the invention are mixed with each other, a salt-like compound is formed that is stable in the pH range between 4 and 10, preferably 3 and 11.

The emulsifier system contained in the composition has the effect of lowering interfacial tension due to the positive and negative partial charges in the molecule. The interfacial activity can be adjusted in targeted manner by suitable selection of the degree of alkoxylation of the components of the emulsifier system.

By mixing the components of the emulsifier system comprising the alkoxylated amine and the carboxylic acid compound the appropriate HLB (Hydrophilic-Lipophilic-Balance) values can be adjusted to yield stable invertible water-in-oil emulsion drilling fluids.

Emulsifying properties may be further optimised by an optional additional variation of the length of the hydrophobic C-chain in the emulsifier components. In this way, it is possible, for example, to produce micro-emulsions under conditions of optimal temperature and optimal salinity. Special formulations of surfactants with water and oil form a micro-emulsion (Winsor type III). The occurrence of certain phases is determined by internal (composition) and external parameters (such as temperature and salinity). The Winsor III phase, also known as a three-phase micro-emulsion (wherein the actual micro-emulsion is the middle phase, coexisting with water and an oil excess phase), is notable for extremely low interfacial tensions (IFT). This state is therefore also described as "optimal", and the associated parameters are described as "optimal salinity" and "optimal temperature". The middle phase is usually of low viscosity. A lower viscosity is desirable for transporting highly viscous heavy crude oils or extra heavy crude oils in pipelines for example.

In this way, it is also possible to produce stable invert emulsion drilling fluids with excellent functional characteristics for an extremely wide range of conditions. As a rule, the degree of alkoxylation is adjusted according to the oil and the brine concentration used, and subsequently adjusted further as necessary depending on the specific drilling conditions.

According to the invention, for example, the same mode of action may be achieved with an alkoxylated dodecylamine in combination with an ether carboxylic acid on an alkoxylated oleyl alcohol base as with an alkoxylated oleyl amine paired with a dodecyl alcohol-based ether carboxylic acid.

In this way, the emulsifier system according to the invention enables variation options in adjusting the desired emulsifier functions and adapting said functions to the required operating characteristics of an invert emulsion drill flushing fluid.

DETAILED DESCRIPTION OF THE INVENTION

In the following, the emulsifier system, the water-in-oil composition and their application will be described.

The composition comprises one or more amine compounds (A) which are one or more alkoxylated primary and/or secondary amine compounds or mixtures thereof, and a carboxylic acid component (B). The components (A) and (B) form the emulsifier system.

Suitable alkoxylated amine compounds according to the invention forming component (A) are surface-active substances derived from or based on, for example, butylamine, pentylamine, hexylamine, octylamine, nonylamine, decylamine, undecylamine, lauryl amine, tridecylamine, tetradecylamine, pentadecylamine, palmityl amine, stearyl amine, arachidyl amine, behenyl amine, lignoceryl amine as well as unsaturated or branched amines with the same C number, for example oleyl amine, 2-ethylhexyl amine or standard commercial or other mixtures such as coconut oil amine or tallow oil amine. Alkoxylated dialkyl amine compounds derived from or based on compounds containing said C-chain lengths and/or heterocyclic, nitrogen-containing compounds, such as imidazol and piperazine, are also suitable.

The starting amine compounds used for the preparation of the alkoxylated amine compound forming component (A) are amines having at least one NH valence, for example, primary and/or secondary amines. The conversion of the amine with alkoxides is achieved by addition with either one or more ethylene oxide, propylene oxide and/or butylene oxide, including block and/or statistical distributions, wherein the average numerical value of alkoxylene units is between 0.5 and 30, preferably between 1 and 10, and most preferred greater 1 to 6. The term "alkoxylated amines" according to another embodiment includes alkanolamines or dialkanolamines or in other words alkoxylated amines with only one or only two alkoxoylate group(s).

The alkoxylated compounds consist preferably of (quasi) statistical mixtures for example even at a degree of alkoxylation of 0.5 (and above) there always exist compounds with a degree of alkoxylation of two and three per molecule. In this case several different amine compounds within components (A) with differing degree of alkoxylation are present.

The degrees of alkoxylation given throughout this invention are average values (number average).

The carboxylic acid compound forming component (B) of the emulsifier system is selected from one or more members of the group of monocarboxylic acids, polycarboxylic acids, polyalkylene glycol ethercarboxylic acids of a monoalcohol and polyalkylene glycol ether carboxylic acids of a polyol. Suitable carboxylic acid compounds are for example the following carboxylic acids: lactic acid, citric acid, oxalic acid, butyric acid, valeric acid, caproic acid, heptanoic acid, caprylic acid, nonanoic acid, capric acid, undecanoic acid, lauric acid, tridecanoic acid, myristic acid, pentadecanoic acid, palmitic acid, stearic acid, behenic acid and the branched and unsaturated types having the same C-length, such as oleic acid. The monocarboxylic acids and the polycarboxylic acids preferably contain 4 to 24, particularly 8 to 18, carbon atoms and particularly preferred 12 to 18 carbon atoms, optionally a hydroxy group. In particular preferred are monocarboxylic acids.

Alcohol polyalkylene glycol ether carboxylic acids based on for example butanol, pentanol, hexanol, heptanol, octanol, nonanol, decanol, undecanol, lauryl alcohol, tridecanol, tetradecanol, pentadecanol, hexadecanol, heptadecanol, octadecanol, behenyl alcohol and the corresponding branched or unsaturated types having the same C-chain such as oleyl alcohol or iso-octanol are also suitable. The listed alcohols and polyalkylene glycols with different chain lengths form the basis of the polyalkylene glycol ether carboxylic acids (B) that are produced by polyaddition with either ethylene oxide, propylene oxide or butylene oxide or mixtures thereof including random or block structures followed by carboxymethylation for example with choloroacetic acid or sodium chloroacetate, wherein the average numerical value of the alkylene oxide units is between 0 and 30, preferably between 0.5 and 10, particularly between 1 and 8.

The emulsifier composition comprising component (A) and component (B) according to the invention should preferably be mixed equimolar related to the functional groups, wherein the average degree of alkoxylation of all amine compounds and all carboxylic acid compounds forming the total mixture should preferably be between 0.5 and 30, particularly between 1 and 10 and most preferred greater 1 to 6. The alkoxy groups are either solely within the amine compounds or within both, the carboxylic acid compounds and the amine compounds.

The emulsifier system according to the invention is preferably soluble at 25° C. in the oil. Exemplary emulsifier combinations are listed in the experimental section, others include: amine-C18-glycol-(2EO)-ether/lactic acid mixture (MARLAZIN OL2/lactic acid), oleyl-imidazoline/oxo-alcohol-C9-(2EO-2PO)-ether carboxylic acid mixture (MARLOWET 5440/MARLOWET 4539), amine-C18-glycol-(7EO)/coconut oil acid mixture MARLAZIN T7/2/coconut oil acid) or oleyl-imidazoline/alcohol-C6-glycol-(3EO-3PO)-ether carboxylic acid mixture (MARLOWET 5440/MARLOWET 4556).

Appropriate combination of the emulsifier components (A) and (B) according to the invention enables oils of different compositions to be used. Examples of oils forming component (C) are aliphatic or cycloaliphatic hydrocarbons such as alphaolefins (LAO), polyalpha-olefins (PAO), internal olefins (10), diesel, biodiesel, Fischer-Tropsch distillates, esters, particularly ethyl and/or methyl-(C12 to C22) fatty acid esters, alcohols, ethers, acetals, (oligo)amides, (oligo)imides and/or (oligo)ketones, also triglycerides or mixtures thereof.

The oil is composed in such manner that it is liquid at 25° C., preferably at 0° C. and most preferably at −10° C. The drilling fluid resulting from the addition of the composition according to the invention is stable in the pH-value range between 4 and 10 preferably between 3 and 11. This pH range describes stability limits. Above and below these limits, the emulsion breaks and allows targeted separation of the various components.

The invertible drilling fluid emulsion obtained from the above described emulsifier system may be broken and inverted by alkalisation with strong caustic solutions such as KOH or NaOH above pH values of 11 or already at pH values of above 10. In this case, the anionic emulsifier component is hydrophilised and in this state it has the properties of an oil-in-water emulsifier. An inversion may also be achieved by addition of strong acids, for example, such as HCl or $H_2SO_4$ below a pH value of 3. In this case the amine will be protonised and forms a salt with the corresponding anion of the added acid.

The conversion is enabled particularly advantageously by readjusting the pH value of cleaved invert drilling fluid emulsions in the pH value range between 4 to 10, preferably 3 and 11, in a homogeneous oil-in-water emulsion (flipping), so that they are able to be reused as drilling fluid.

It is possible to reuse a large portion of the drilling fluid by introducing and adjusting the requisite additives listed previously for said use. In practice, it results in financial savings and shorter reconditioning process steps, which presents significant advantages especially in offshore drilling operations.

The invertibility of the drilling fluids according to the invention enables the penetration of the filter cake and the wetting of the filter cake particles to be reversed. Solids that can be wetted with water are essential for the subsequent acid wash, so that for example the particles of the filter cake can be dissolved with acid or dispersed, and also makes it easier to carry out the steps necessary for regenerating the oil-charged drilling material and subsequent removal, for example cleaning oil-contaminated solid surfaces with water-based rinsing aids.

The composition according to the invention further contains water, forming component (F). The aqueous phase of the drilling fluid may contain for example weighting agents, fluid-loss additives, alkali reserves, viscosity regulators, water-soluble and insoluble salts and the like.

The drilling fluid according to the invention may contain up to 70% by weight water, preferably 20 to 40% by weight, for example 30% by weight water, particularly a salt-containing aqueous phase (brine) is usually used.

The emulsifier components are adjusted suitably and an appropriate concentration is used within the limits of this invention. The drilling fluid according to the invention is capable to emulsify substantial quantities of water even electrolyte-rich water, such as e.g. $CaCl_2$ solutions or brine. This property of the drilling fluid according to the invention means that it may also be used to absorb water that settles in the lower region of the drilled hole caused by the ingress of water, without interrupting the drilling operation.

Other additives may also used besides the emulsifier or emulsifier system, including for example wetting agents, weighting agents to increase weight or density, "fluid loss" additives to minimise fluid loss, additives for creating an alkalinity reserve, for filtration control and/or to control rheological properties.

Lime or other alkaline substances may be added to oil-based drilling fluids in order to create an alkalinity reserve. The alkalinity reserve serves to maintain the viscosity and stability of the drilling fluid when the drilling fluid is exposed to variable external influences. This is particularly important in areas where acidic gases such as $CO_2$ or $H_2S$ are encountered during drilling. In the absence of an alkalinity reserve, acidic gases can lower the pH value of the drilling fluid and thus weaken the emulsion stability and undesirably change the viscosity of conventional drilling fluids. Repair or removal of the drilling fluid is expensive and therefore undesirable.

The drilling fluid according to the invention may contain thickening agents such as clays consisting of bentonite, hectorite, attapulgite and/or mixtures thereof, particularly such mixtures as have been rendered organophilic by surface treatment. Surface treatment may be carried out with quaternary ammonia compounds, for example, so that the clays are rendered hydrophobic. The clays are used in a concentration from 1 to 10% by weight. The polar character of the emulsifying component according to the invention may reduce the quantity of thickening agent required depending on the type of the thickening agent in question.

Additives selected from the group including alkaline and alkaline earth halides, sulphates, carbonates, hydrogencarbonates, also hydroxides and iron oxides, create what is known as an alkalinity reserve.

For example, in "acid gas drilling" acid gases such as $CO_2$ and $H_2S$ may be absorbed. The drilling fluid according to the invention is stable in the pH value range from 4 to 10, preferably from 4 to 10, and therefore provides a substantial alkalinity reserve in the upper pH value range (10 to 10.5). The density of the drilling fluid may also be modified via the salt concentration in the water phase.

Emulsifier components (A) and (B) are preferably used in a molar ratio related to the respective numbers of the functional groups (amine or carboxylic acid) from 1:1.5 to 0.5 to 1, particularly 1:1.2 to 0.8 to 1.

The pH value of the drilling fluid according to the invention may be adjusted to pH values above 4. Preferably from 8 to 10.0 or 10 to 10.5 by appropriate mixing of the emulsifying components (A) and (B) according to the invention, such that the drilling fluid already has its own alkali reserve.

At the same time, the emulsifying components (A) and (B) according to the invention have a corrosion inhibiting effect for metal surfaces and reduce frictional resistances, thus functioning as lubricants.

The invention further relates to a composition (the drilling fluid) comprising at least components (A) to (F):
(A) one or more primary, secondary or tertiary alkoxylated amine compounds and
(B) one or more carboxylic acid compound selected from one or more members of the group of monocarboxylic acids, polycarboxylic acids, polyalkylene glycol ether carboxylic acids of a monoalcohol and polyalkylene glycol ether carboxylic acids of a polyol,
(C) an oil that is fluid at 25° C., and
(D) one or more thickening agent for thickening the oil or the oil phase, selected from the group including clays, polymers, alumina and silica, and
(E) one or more additives selected from the group including alkaline and earth alkaline halides, sulphates, carbonates, hydrogencarbonates, also hydroxides and iron oxides, and
(F) water and optionally wetting agents, weighting agents to increase weight or density, "fluid loss" additives to minimise fluid loss and a method for drilling a drill hole using above composition/drilling fluid comprising the step of introducing the drilling fluid into the drilled hole during the drilling operation.

In this context, the method may further comprise steps according to which the drilling fluid including the drilled material (cuttings) is extracted, the drilled material is separated from the drilling fluid, for example by sieving or centrifuging, and the cleaned drilling fluid is reintroduced into the drilled hole, optionally after the addition of components such as those described in the preceding, which have been depleted in the drilling fluid during the drilling operation.

The separated drilled material may be treated with an alkali or an acid solution to break the residual drilling fluid in the form of a water-in-oil emulsion by adjusting a pH value lower than 3 or higher than 10, particularly higher than 11, and thus obtain an oil-in-water emulsion as a flushing fluid and a fluid for removing the oil from the drilled material, in order to obtain a drilled material even further depleted of the oil.

Another use of the emulsifier system according to this invention is the improvement of the cold flow properties of heavy crude oils and extra heavy crude oils. Heavy crude oils are defined as any liquid petroleum with an API gravity less than 20°, Extra heavy oil is defined with API gravity below 10.0° API. In this use the heavy or extra heavy crude oil becomes the oil (C) or the oil phase of the composition according to the invention. API is measured according to ASTM D287.

Experimental Section

Various compositions were prepared using the following components:

| | |
|---|---|
| 25% $CaCl_2$ solution | MISwaco, Houston |
| Barium sulphate | M-I BAR, MISwaco, Houston |
| Lime | Austin White Lime Company, Austin |
| Mineral oil | Gravex 915, Shell |
| Wetting agent | FM WA II, Fluid Management Ltd, Houston |
| Polymer thickening agent | HRP, MI Swaco, Houston |
| Quartz | Milwhite, Inc, |
| Clay | FM VIS LS, Fluids Management, Houston |

Example 1

A diesel-based drilling fluid was prepared at room temperature from the components listed below, combined in the order described, having been homogenised beforehand using a Hamilton Beach overhead mixer on full power for about 40 minutes and being homogenised within 5 minutes afterwards in a Silverson L4RT mixer at 3500 rpm. The mixture was evaluated visually taking into account the precipitation of organic, aqueous and inorganic phases.

| Product | Unit | 1.1 | 1.2 | 1.3 | 1.4 |
|---|---|---|---|---|---|
| Diesel | % by wt. | 28.0 | 28.0 | 28.0 | 28.0 |
| Clay | % by wt. | 1.0 | 1.0 | 1.0 | 1.0 |
| Polymer thickening agent | % by wt. | 0.2 | 0.2 | 0.2 | 0.2 |
| Lime | % by wt. | 0.7 | 0.7 | 0.7 | 0.7 |
| Emulsifier 1: Oxo-C13-alcohol glycol-(3EO)-ether (MARLIPAL O13/30) | % by wt. | 1.8 | — | — | — |
| Emulsifier 2: Amine-C18-glycol-(2EO)-ether/alcohol C1214-glycol-(3EO)-ether carboxylic acid mixture (MARLAIN OL2/MARLOWET 4541) | % by wt. | — | 1.8 | — | — |
| Emulsifier 3: Amine-C18-glycol-(2EO)-ether (MARLAZIN OL 2) | % by wt. | — | — | 1.8 | — |
| Emulsifier 4: C1214-glycol-(3EO)-ether carboxylic acid (MARLOWET 4541) | % by wt. | — | — | — | 1.8 |
| Wetting agent | % by wt. | 0.003 | 0.003 | 0.003 | 0.003 |
| 25% CaCl2 solution | % by wt. | 18.3 | 18.3 | 18.3 | 18.3 |
| Barium sulphate | % by wt. | 45.0 | 45.0 | 45.0 | 45.0 |
| Quartz | % by wt. | 5.0 | 5.0 | 5.0 | 5.0 |
| Stability | Hrs. | <2/<1 | >16/>16 | <1/<1 | <4/<2 |
| Temperature | ° C. | 20/70 | 20/70 | 20/70 | 20/70 |

(EO = monomer unit ethylene oxide, PO = monomer unit propylene oxide)

Example 1 shows that selection of an emulsifier system consisting of amine-C18-glycol-(2EO)-ether/alcohol C1214-glycol-(3EO)-ether carboxylic acid enabled stability to be maintained for >16 hours both at room temperature and at 70° C.

This could not be achieved using the single components described as Emulsifier 3 and Emulsifier 4, also not with Emulsifier 1.

Example 2

A rapeseed methyl ester-based drilling fluid was prepared as in example 1. Selection of an emulsifier system consisting of amine-C18-glycol-(2EO)-ether/alcohol C1214-glycol-(5EO)-ether carboxylic acid enabled the stability required for this application to be maintained for >16 hours both at room temperature and at 70° C.

| Product | Unit | 2.1 | 2.2 |
|---|---|---|---|
| Rapeseed methylester | % by wt. | 28.0 | 28.0 |
| Clay | % by wt. | 1.0 | 1.0 |
| Polymer thickening agent | % by wt. | 0.2 | 0.2 |
| Lime | % by wt. | 0.7 | 0.7 |
| Emulsifier 1: Oxo-C13-alcohol-glycol-(5EO)-ether (MARLIPAL O13/50) | % by wt. | 1.8 | — |
| Emulsifier 2: Amine-C18-glycol-(2EO)-ether/alcohol C1214-glycol-(5EO)-ether carboxylic acid mixture (MARLAZIN OL 2/MARLOWET 1072) | % by wt. | — | 1.8 |
| Wetting agent | % by wt. | 0.003 | 0.003 |
| 25% CaCl$_2$ solution | % by wt. | 18.3 | 18.3 |
| Barium sulphate | % by wt. | 45.0 | 45.0 |
| Quartz | % by wt. | 5.0 | 5.0 |
| Stability | Hrs. | <1/<1 | >16/>16 |
| Temperature | ° C. | 20/70 | 20/70 |

Example 3

A rapeseed methyl ester-based drilling fluid was prepared as in example 1. Selection of an emulsifier system consisting of amine-C18-glycol-(2EO)/lactic acid enabled the stability required for this application to be maintained for >16 hours both at room temperature and at 70° C.

| Product | Unit | 3.1 | 3.2 |
|---|---|---|---|
| Mineral oil | % by wt. | 28.0 | 28.0 |
| Clay | % by wt. | 1.0 | 1.0 |
| Polymer thickening agent | % by wt. | 0.2 | 0.2 |
| Lime | % by wt. | 0.7 | 0.7 |
| Emulsifier 1: Nonyl phenol-glycol-(3EO)-ether (MARLOPHEN NP3) | % by wt. | 1.8 | — |
| Emulsifier 3: Amine-C18-glycol-(2EO)/lactic acid mixture (MARLAZIN OL2/lactic acid) | % by wt. | — | 1.8 |
| Wetting agent | % by wt. | 0.003 | 0.003 |
| 25% CaCl$_2$ solution | % by wt. | 18.3 | 18.3 |
| Barium sulphate | % by wt. | 45.0 | 45.0 |
| Quartz | % by wt. | 5.0 | 5.0 |
| Stability | Hrs. | <3/<1 | >16/>16 |
| Temperature | ° C. | 20/70 | 20/70 |

Example 4

A drilling fluid based on paraffin oil (technical, low-aromatic standard oil) was prepared as in example 1. Selection of an emulsifier system consisting of amine-C12-glycol-(2EO)-ether/alcohol-C1618-glycol-(2EO-2PO)-ether carboxylic acid enabled the stability required for this application to be maintained for >16 hours both at room temperature and at 70° C.

| Product | Unit | 4.1 | 4.2 |
|---|---|---|---|
| Paraffin oil | % by wt. | 28.0 | 28.0 |
| Clay | % by wt. | 1.0 | 1.0 |
| Polymer thickening agent | % by wt. | 0.2 | 0.2 |
| Lime | % by wt. | 0.7 | 0.7 |
| Emulsifier 1: C18-alcohol-glycol-(5EO)-ether (MARLOWET 5001) | % by wt. | 1.8 | — |
| Emulsifier 2: Amine-C12-glycol-(2EO)-ether/Alcohol C1618-glycol-(2EO-2PO)-ether carboxylic acid mixture (Trial product/MARLOWET 4560 | % by wt. | — | 1.8 |
| Wetting agent | % by wt. | 0.003 | 0.003 |
| 25% CaCl2 solution | % by wt. | 18.3 | 18.3 |
| Barium sulphate | % by wt. | 45.0 | 45.0 |
| Quartz | % by wt. | 5.0 | 5.0 |
| Stability | Hrs. | <3/<1 | >16/>16 |
| Temperature | ° C. | 20/70 | 20/70 |

Example 5

In order to study the improvement of cold flow properties of heavy crude oils and extra heavy crude oils achieved by adding the emulsifier system and water the following model liquid consisting of:

MERKUR WOP 240 (Mineral oil with 30% naphthenic bounded CW and 70% paraffin thereof are 80% iso paraffin and 20% n-paraffins (C25 to C42),
PARAFOL 22-95 n-Docosan (min 95%),
PARAFOL 18-97 n-Octadecan (min. 97%),
SASOLWAX 3971 iso paraffin (C24 to C80), microcrystalline wax was used having the following composition:

| Model Liquid | [% by weight] |
|---|---|
| MERKUR WOP 240 | 60 |
| PARAFOL 22-95 | 10 |
| PARAFOL 18-97 | 5 |
| SASOLWAX 3971 | 25 |

Water in Oil—Emulsion Composition:

| Emulsion | [% by weight] |
|---|---|
| C12-C14 2 EO Ether carboxylic acid + Tallow fatty amine 1EO | 0.75 |
| Model Liquid | 94.25 |
| Water comprising 10 weight % CaCl$_2$ | 5.0 |

The emulsifier is added to the oil phase, Thereafter the water is added while stirting gently achieving spontaneously an emulsion showing the following viscosities at different temperatures,

| Temperature [° C.] | Emulsion [mPas] | Model Liquid [mPas] |
|---|---|---|
| 30 | 4300 | 5550 |
| 40 | 1700 | 2650 |

| Temperature [° C.] | Emulsion [mPas] | Model Liquid [mPas] |
|---|---|---|
| 50 | 900 | 1400 |
| 60 | 350 | 450 |

Viscosity is measured using a Haake Mars 2 cone plate system (35/2°) at a shear rate of 10/s

The invention claimed is:

1. A composition comprising:
   (A) at least one of alkoxylated primary amine compounds, alkoxylated secondary amine compounds, or a mixture thereof and
   (B) at least one of carboxylic acid compounds selected from at least one of polyalkene glycol ether carboxylic acids of a monoalcohol, poly-alkylene glycol ether carboxylic acids of a polyol, or mixtures thereof
   (C) an oil that is liquid at least at 25° C., and
   (F) water,
   wherein the composition further comprises salts dissolved in the water (F) in a concentration of greater than 1% by wt. and the composition is a water-in-oil-emulsion wherein the oil (C) forms the continuous phase and the water (F) forms the dispersed phase
   wherein the polyalkylene glycol ether carboxylic acids of a monoalcohol and/or a polyol have the general formula

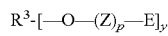

wherein
   $R^3$ stands for a hydrocarbon radical with 8 to 24 hydrocarbon atoms,
   Z stands for alkoxylate groups —$CH_2$—$CHR^2$—O— or $CHR^2$—$CH_2$—O— which may or may not be different for each p,
   $R^2$ stands for H, a methyl group or an ethyl group, which may or may not be different for each p,
   E stands for —$CH_2$—COOH,
   p stands for average numerical values from greater than 0 to 15 and
   y is 1 in the case of a monoalcohol, and 2, 3, 4, 5 or 6 in the case of a polyol,
   wherein the amine compounds have the following general formula

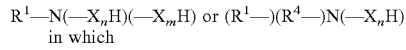

in which
   $R^1$, $R^4$ each stand for a hydrocarbon radical with 4 to 24 hydrocarbon atoms,
   X stands for $CH_2$—$CHR^2$—O— or —$CHR^2$—$CH_2$—O—, and may or may not be different for each m and n,
   $R^2$ stands for H, a methyl group or an ethyl group and may or may not be different for each m and n,
   n and m independently of one another stand for average numerical values greater than 0, and independently thereof the sum of n plus m is 0.5 and above,
   and wherein for $R^1$—N(—$X_n$H)(—$X_m$H) n+m+p is between 2 and 8, and for ($R^1$—)($R^4$—)N(—$X_n$H) n+p is between 2 and 8.

2. The composition according to claim 1, wherein $R^1$ and $R^4$ form at least one ring with a total of 4 to 24 hydrocarbon atoms.

3. The composition according to claim 1, wherein the oil (C) has a flashpoint higher than 60° C. and which is measured at temperatures of higher than 60° C. up to 70° C. according to DIN 51755 and at temperatures higher than 70° C. according to EN ISO 2719.

4. The composition according to claim 3, wherein said flashpoint according to DIN 51755 is greater than 70° C.

5. The composition according to claim 1, wherein the oil (C) comprises hydrocarbons, esters, alcohols or mixtures thereof.

6. The composition according to claim 5, wherein said hydrocarbons are aliphatic or cycloaliphatic and the esters are ethyl and/or methyl (C12 to C22) fatty acid esters.

7. The composition according to claim 1, wherein the composition further comprises salts dissolved in the water (F) in a concentration greater than 5% by wt.

8. The composition according to claim 7, wherein said salts are in a concentration greater than 15% by wt.

9. The composition according to claim 7, wherein said salts are in a concentration greater than 20% by wt.

10. The composition according to claim 1, wherein the composition further comprises
    (D) at least one thickening agent for thickening the oil, and
    (E) at least one additive selected from the group consisting of alkaline and earth alkaline halides, sulphates, carbonates, hydrogencarbonates, hydroxides, iron oxides, and mixtures thereof.

11. The composition according to claim 10, wherein said thickening agent is selected from the group consisting of clays, polymers, alumina, silica, and mixtures thereof.

12. The composition according to claim 10, wherein
    (D) the thickening agent is a clay selected from bentonite, hectorite, attapulgite and mixtures thereof.

13. The composition according to claim 12, wherein the thickening agent is an organically modified clay.

14. The composition according to claim 12, wherein said clay is organically modified with a fatty amine.

15. The composition according to claim 10, wherein the additive
    (E) is calcium carbonate, barium sulphate, iron-Ill-oxide or mixtures thereof.

16. The composition according to claim 15, wherein said additive may be in the form of minerals.

17. The composition according to claim 10, wherein the composition comprises independently of each other
    0.05 to 10% by wt. amine compound (A) and carboxylic acid compound (B),
    (C) 5% by wt. to 50% by wt. the oil,
    (D) 0.05% by wt. to 5% by wt. the thickening agent,
    (E) 1% by wt. to 60% by wt. the additive,
    (F) 2% by wt. to 50% by wt. water.

18. The composition according to claim 17, wherein the composition comprises 0.1% by wt. to 5% by wt. (A) and (B).

19. The composition according to claim 17, wherein (C) is present in an amount of from 10% by wt. to 20% by wt.

20. The composition according to claim 17, wherein (D) is present in an amount of from 0.5% by wt. to 3% by wt.

21. The composition according to claim 17, wherein (E) is present in an amount of from 30% by wt. to 50% by wt.

22. The composition according to claim 17, wherein (F) is present in an amount of from 2% by wt. to 40% by wt.

23. The composition according to claim 17, wherein (F) is present in an amount of from 2% by wt. to 30% by wt.

24. The composition according to claim 10, comprising the amine compound (A) and the carboxylic acid compound (B) in molar ratio from 1:1.5 to 0.5 to 1, each related to the number of amine and carboxylic acid functional groups in (A) and (B).

25. The composition according to claim 24, wherein said molar ratio is from 1:1.2 to 0.8 to 1.

26. The composition according to claim 1, wherein the composition has a pH value from 3 to 11.

27. The composition according to claim 26, wherein said pH is from 4 to 10.

28. A method of improving flow of heavy hydrocarbons comprising introducing the composition of claim 1
into heavy crude oils or extra heavy crude oils to form water-in-oil emulsions with reduced viscosity.

29. A method of forming a water-in-oil emulsion comprising:
introducing a composition comprising:
(A) at least one of alkoxylated primary amine compounds, alkoxylated secondary amine compounds, or a mixture thereof and
(B) at least one of carboxylic acid compounds selected from at least one of polyalkylene glycol ether carboxylic acids of a monoalcohol, polyalkylene glycol ether carboxylic acids of a polyol, or mixtures thereof into a mixture of (F) water and (C) oil to form said water-in-oil emulsion, wherein the oil (C) is liquid at least at 25° C., and wherein the emulsion further comprises salts dissolved in the water (F) in a concentration of greater than 1% by wt. and wherein the oil (C) forms the continuous phase and the water (F) forms the dispersed phase,
wherein the polyalkylene glycol ether carboxylic acids of a monoalcohol and/or a polyol have the general formula $R^3\text{-}[\text{—O—}(Z)_p\text{—E}]_y,$ wherein
$R^3$ stands for a hydrocarbon radical with 8 to 24 hydrocarbon atoms,
Z stands for alkoxylate groups —$CH_2$—$CHR^2$—O— or $CHR^2$—$CH_2$—O— which may or may not be different for each p,
$R^2$ stands for H, a methyl group or an ethyl group, which may or may not be different for each p,
E stands for —$CH_2$—COOH,
p stands for average numerical values from greater than 0 to 15 and
y is 1 in the case of a monoalcohol, and 2, 3, 4, 5 or 6 in the case of a polyol,
wherein the amine compounds have the following general formula $R^1\text{—N}(\text{—}X_nH)(\text{—}X_mH)$ or $(R^1\text{—})(R^4\text{—})N(\text{—}X_nH)$
in which $R^1, R^4$ each stand for a hydrocarbon radical with 4 to 24 hydrocarbon atoms,
X stands for $CH_2$—$CHR^2$—O— or —$CHR^2$—$CH_2$—O—, and may or may not be different for each m and n
$R^2$ stands for H, a methyl group or an ethyl group and may or may not be different for each m and n,
n and m independently of one another stand for average numerical values greater than 0, and independently thereof the sum of n plus m is 0.5 and above,
and wherein for $R^1\text{—N}(\text{—}X_nH)(\text{—}X_mH)$ n+m+p is between 2 and 8, and for $(R^1\text{—})(R^4\text{—})N(\text{—}X_nH)$ n+p is between 2 and 8.

* * * * *